(12) United States Patent
Zia et al.

(10) Patent No.: US 11,106,949 B2
(45) Date of Patent: Aug. 31, 2021

(54) ACTION CLASSIFICATION BASED ON MANIPULATED OBJECT MOVEMENT

(71) Applicant: Microsoft Technology Licensing, LLC, Redmond, WA (US)

(72) Inventors: Muhammad Zeeshan Zia, Kirkland, WA (US); Federica Bogo, Zurich (CH); Harpreet Singh Sawhney, Kirkland, WA (US); Huseyin Coskun, Munich (DE); Bugra Tekin, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 16/362,530

(22) Filed: Mar. 22, 2019

(65) Prior Publication Data
US 2020/0302245 A1 Sep. 24, 2020

(51) Int. Cl.
*G06K 9/00* (2006.01)
*G06K 9/62* (2006.01)
*G06N 3/08* (2006.01)

(52) U.S. Cl.
CPC ....... *G06K 9/6269* (2013.01); *G06K 9/00355* (2013.01); *G06K 9/00744* (2013.01); *G06K 9/6256* (2013.01); *G06N 3/08* (2013.01)

(58) Field of Classification Search
CPC ............. G06K 9/6269; G06K 9/00355; G06K 9/00744; G06K 9/6256; G06K 9/00335; G06N 3/08
See application file for complete search history.

(56) References Cited

U.S. PATENT DOCUMENTS

| 6,252,598 | B1 * | 6/2001 | Segen | G06F 3/017 |
| | | | | 345/156 |
| 2002/0041327 | A1 * | 4/2002 | Hildreth | G06K 9/00375 |
| | | | | 348/42 |

(Continued)

OTHER PUBLICATIONS

Matsufuji, Akihiro, Wei-Fen Hsieh, Hao-Ming Hung, Eri Shimokawara, Toru Yamaguchi, and Lieu-Hen Chen. "A Method of Action Recognition in Ego-Centric Videos by Using Object-Hand Relations." In 2018 Conference on Technologies and Applications of Artificial Intelligence (TAAI), pp. 54-59. IEEE, 2018. (Year: 2018).*

(Continued)

*Primary Examiner* — Carol Wang
(74) *Attorney, Agent, or Firm* — Alleman Hall Creasman & Tuttle LLP

(57) ABSTRACT

A computing device, including a processor configured to receive a first video including a plurality of frames. For each frame, the processor may determine that a target region of the frame includes a target object. The processor may determine a surrounding region within which the target region is located. The surrounding region may be smaller than the frame. The processor may identify one or more features located in the surrounding region. From the one or more features, the processor may generate one or more manipulated object identifiers. For each of a plurality of pairs of frames, the processor may determine a respective manipulated object movement between a first manipulated object identifier of the first frame and a second manipulated object identifier of the second frame. The processor may classify at least one action performed in the first video based on the plurality of manipulated object movements.

20 Claims, 8 Drawing Sheets

(56) References Cited

U.S. PATENT DOCUMENTS

| | | | | |
|---|---|---|---|---|
| 2011/0221768 | A1* | 9/2011 | Hasegawa | G06F 3/011 345/629 |
| 2012/0027252 | A1* | 2/2012 | Liu | G06K 9/00355 382/103 |
| 2012/0062736 | A1* | 3/2012 | Xiong | G06K 9/00389 348/143 |
| 2012/0242566 | A1* | 9/2012 | Zhang | G06F 3/017 345/156 |
| 2013/0182898 | A1* | 7/2013 | Maeda | G06F 3/005 382/103 |
| 2013/0329264 | A1* | 12/2013 | Okutani | H04N 1/00018 358/488 |
| 2014/0147035 | A1* | 5/2014 | Ding | G06K 9/00355 382/164 |
| 2015/0055829 | A1* | 2/2015 | Liang | G06K 9/00536 382/103 |
| 2015/0288883 | A1* | 10/2015 | Shigeta | G06F 3/0304 345/642 |
| 2016/0012599 | A1* | 1/2016 | Kuboyama | G06F 3/0425 348/348 |
| 2017/0161957 | A1* | 6/2017 | Yajima | G06K 9/4604 |
| 2020/0167715 | A1* | 5/2020 | Bhatt | G06Q 10/0633 |

OTHER PUBLICATIONS

Cai, Minjie, Feng Lu, and Yue Gao. "Desktop action recognition from first-person point-of-view." IEEE transactions on cybernetics 49, No. 5 (2018): 1616-1628. (Year: 2018).*

Shen, Xiaohui, Gang Hua, Lance Williams, and Ying Wu. "Dynamic hand gesture recognition: An exemplar-based approach from motion divergence fields." Image and Vision Computing 30, No. 3 (2012): 227-235. (Year: 2012).*

Sridhar, Muralikrishna, Anthony G. Cohn, and David C. Hogg. "Learning functional object categories from a relational spatiotemporal representation." In ECAI 2008: 18th European Conference on Artificial Intelligence (Frontiers in Artificial Intelligence and Applications), pp. 606-610. IOS Press, 2008. (Year: 2008).*

Cai, Minjie, Kris M. Kitani, and Yoichi Sato. "Understanding Hand-Object Manipulation with Grasp Types and Object Attributes." In Robotics: Science and Systems, vol. 3. 2016. (Year: 2016).*

Arapi, et al., "DeepDynamicHand: A Deep Neural Architecture for Labeling Hand Manipulation Strategies in Video Sources Exploiting Temporal Information", In Journal of Frontiers in Neurorobotics, vol. 12, Article 86, Dec. 17, 2018, pp. 1-16.

"International Search Report and Written Opinion Issued in PCT Application No. PCT/US20/017807", dated May 12, 2020, 12 Pages.

Vaca-Castano, et al., "Improved Scene Identification and Object Detection on Egocentric Vision of Daily Activities", In Journal of Computer Vision and Image Understanding, vol. 156, Mar. 2017, pp. 92-103.

Finn, et al., "Model-Agnostic Meta-Learning for Fast Adaptation of Deep Networks", In Proceedings of the 34th International Conference on Machine Learning, vol. 70, Jul. 18, 2017, 13 Pages.

Goodfellow, et al., "Deep Learning", In Publication of MIT press, Nov. 1, 2016, 2 Pages.

Lea, et al., "Temporal Convolutional Networks for Action Segmentation and Detection", In Proceedings of the IEEE Conference on Computer Vision and Pattern Recognition, Jan. 1, 2017, 10 Pages.

Singh, et al., "A Multi-Stream Bi-Directional Recurrent Neural Network for Fine-Grained Action Detection", In Proceedings of the IEEE Conference on Computer Vision and Pattern Recognition, Jan. 1, 2016, 10 Pages.

Tran, et al., "Learning spatiotemporal features with 3D convolutional networks", In Proceedings of the IEEE International Conference on Computer Vision, Dec. 7, 2015, pp. 4489-4497.

\* cited by examiner

ACTION CLASSIFICATION BASED ON MANIPULATED OBJECT MOVEMENT

BACKGROUND

Large amounts of digital video have become available with the proliferation of inexpensive digital cameras and storage. Such video data may have various practical applications in industry. However, understanding the contents of such video, especially at large scale, often requires human operators to view such video, which can be costly and time-consuming. Further, the application of artificial intelligence techniques to analyze digital video presents many challenges, as discussed in detail below.

SUMMARY

According to one aspect of the present disclosure, a computing device is provided, including a processor configured to receive a first video including a plurality of frames. For each frame of the plurality of frames, the processor may be further configured to determine that a target region of the frame includes a target object. The processor may be further configured to determine a surrounding region within which the target region is located. The surrounding region may be smaller than the frame and the target region may be smaller than the surrounding region. The processor may be further configured to extract one or more features located in the surrounding region. From the one or more features, the processor may be further configured to generate one or more manipulated object identifiers. For each of a plurality of pairs of frames of the first video respectively including a first frame and a second frame, the processor may be further configured to determine a respective manipulated object movement between a first manipulated object identifier of the first frame and a second manipulated object identifier of the second frame. The processor may be further configured to classify at least one action performed in the first video based on the plurality of manipulated object movements.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As the inventors have recognized, classifying video inputs using machine learning algorithms typically involves the use of large amounts of labeled training data. Such training data is typically labeled manually and is time-consuming and expensive to prepare. For example, end-to-end training of video input classifiers, in which the classifier is trained starting from raw video data and corresponding labels, may require a larger training data set than would be practical to produce.

As an alternative to end-to-end training, transfer learning may be used to train video classifiers. In transfer learning, a small number of layers close to an output node of a deep neural network may be fine-tuned using a set of training data. The deep neural network used in transfer learning may be pre-trained such that it may be used with a variety of different training data sets. However, existing transfer learning methods for video input classification may still require training data sets that are larger than would be easy to provide, especially for scenarios in which fine-scale actions and details of actions are required for action classification.

In addition, when neural networks are trained to classify actions performed in a video, background elements that occur in the training data but are not related to the action may be erroneously treated as signal rather than noise. Thus, the classifier may give incorrect results when used at runtime to classify videos with backgrounds that differ from those used in training.

Figure 1:
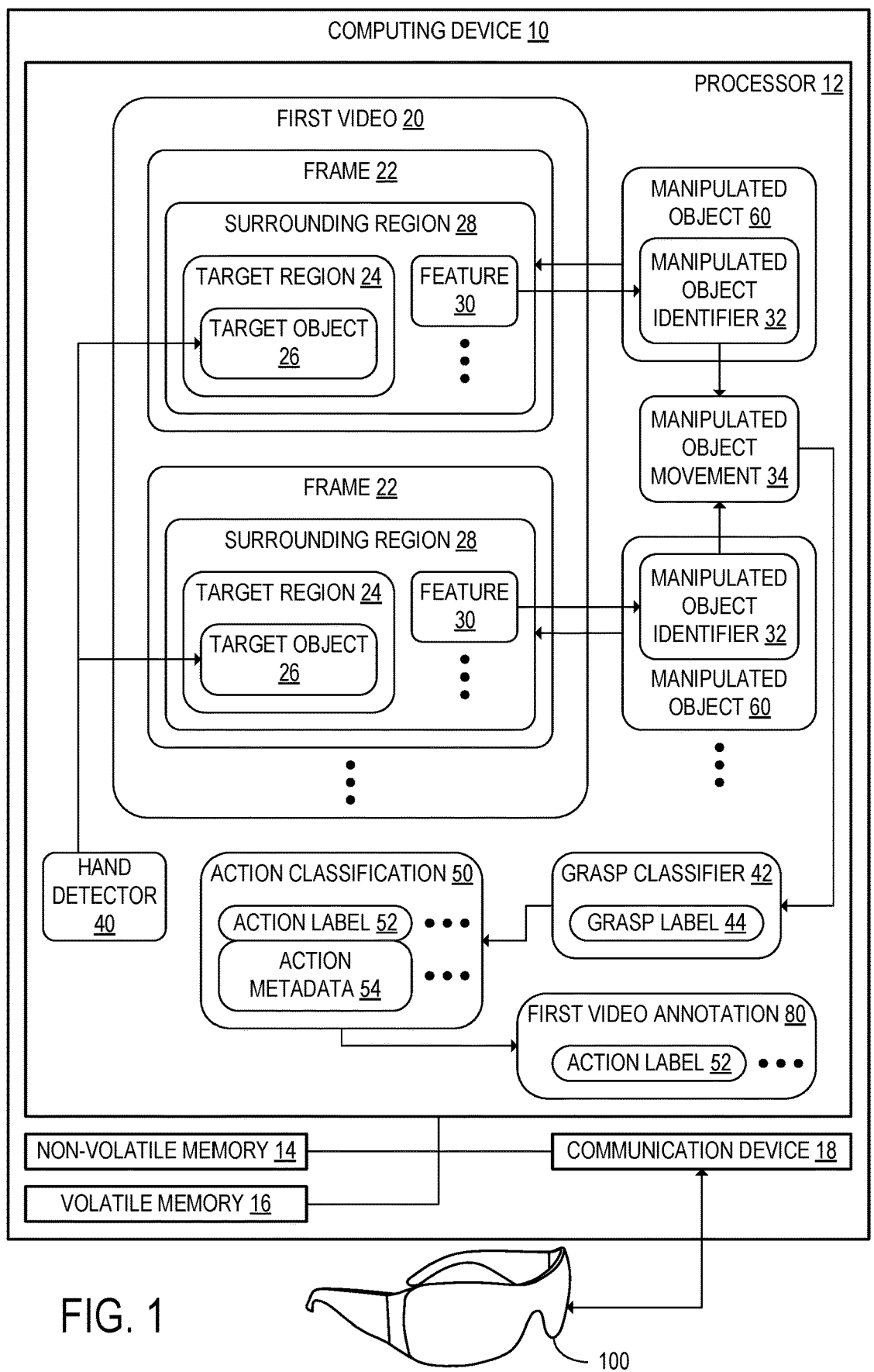
FIG. 1 schematically depicts an example computing device, according to one embodiment of the present disclosure.

In order to address the issues discussed above, the inventors have conceived of the following devices and methods. FIG. 1 schematically depicts an example computing device 10 according to one embodiment of the present disclosure. The computing device 10 may include a processor 12, non-volatile memory 14, volatile memory 16, and/or one or more communication devices 18. The computing device 10 may further include, in some embodiments, one or more input devices, output devices, and/or other components. The computing device 10 may, in some examples, be an offboard computing device configured to communicate with a head-mounted display device 100 using the one or more communication devices 18. In other embodiments, the computing device 10 may be a server computing device configured to communicate with the head-mounted display device 100 over a network. Additionally or alternatively, the computing device 10 may communicate with other computing devices that are not head-mounted display devices, such as a smartphone, a tablet, a wall-mounted computing device, or a desktop or laptop computer. Although the computing device 10 is shown in FIG. 1 as a single physical device, the computing device 10 may be instantiated in other embodiments across a plurality of computing devices configured to communicate via their respective communication devices 18. In such embodiments, video and other types of imaging and depth sensors may be mounted to capture the action being performed while the computing device 10 is separate from the sensor and the display. The display device may be head-mounted or standalone.

In one example use case, a depth sensor may be mounted such that it images an assembly line. The depth sensor may communicate imaging data to the computing device 10, which may use the methods discussed below to monitor and assess the correctness and accuracy of actions performed by workers on the assembly line. The computing device 10 may be configured to detect and classify actions performed by the assembly line workers based on the imaging data received from the depth sensor.

Figure 2:
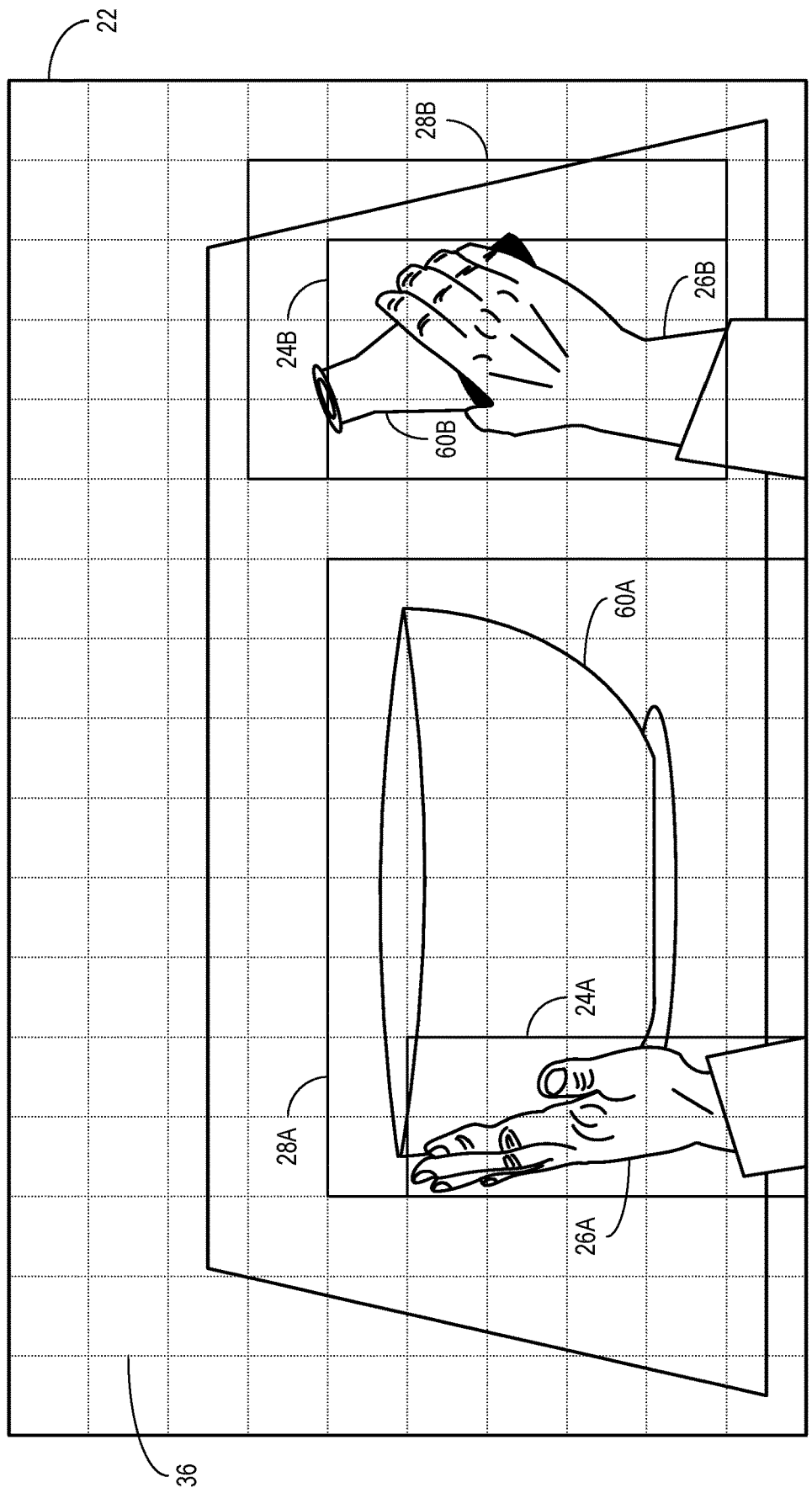
FIG. 2 shows an example frame of a first video, according to the embodiment of FIG. 1.

The processor 12 of the computing device 10 may be configured to receive a first video 20 including a plurality of frames 22. For example, the processor 12 may receive the first video 20 from the head-mounted display device 100. An example frame 22 of a first video 20 is shown in FIG. 2. In FIG. 2, the processor 12 is further configured to divide the frame 22 into a plurality of cells 36. Each cell 36 may be rectangular, as shown in the example of FIG. 2, or may alternatively have some other shape. By dividing the frame 22 into a plurality of cells 36, the processor 12 may allow one or more regions of the frame 22 to be selected for further processing, as discussed in further detail below.

For each frame 22 of the plurality of frames 22 of the first video 20, the processor 12 may be further configured to determine that a target region 24 of the frame 22 includes a target object 26. In some embodiments, as in the example of FIG. 2, the target object 24 may be a hand. In other embodiments, the target object 26 may be a tool manipulated by a user, the user's whole body, or some other type of object. In embodiments in which the frame 22 is divided into a plurality of cells 36, the target region 24 may be formed by one or more cells 36. For example, as shown in FIG. 2, the target region 24 may be a rectangular bounding box around the target object 26.

Returning to FIG. 1, in embodiments in which the target object 26 is a hand, the processor 12 may be further configured to determine that the at least one target region 24 of the frame 22 includes a hand at least in part by inputting the plurality of frames 22 into a hand detector 40. The hand detector 40 may be a machine learning algorithm configured to take the frame 22 as an input and to output a determination of whether the frame 22 includes a hand. The hand detector 40 may further output an indication of the target region 24 in which the hand is located. The hand detector 40 may be trained prior to runtime using hand detector training data including a plurality of images labeled with respective indications of whether the image includes one or more hands. The hand detector training data may further include location metadata that indicates a location of each hand shown in the plurality of images. In some embodiments, the hand detector 40 may be selected from the group consisting of a recurrent neural network (RNN), a three-dimensional convolutional neural network (3D-CNN), and a temporal convolutional neural network (TCNN). In embodiments in which the hand detector 40 is an RNN, the hand detector 40 may be a long short-term memory (LSTM) network. Additionally or alternatively to the example machine learning algorithms provided above, it is understood that other types of machine learning algorithms may be used to implement the hand detector 40.

The processor 12 may be further configured to determine a surrounding region 28 within which the target region 24 is located. The surrounding region 28 is a proper subset of the frame 22 and is therefore smaller than the frame 22. Similarly to the target region 24, the surrounding region 28 may be a rectangular bounding box, as in the example of FIG. 2. The surrounding region 28 may be formed by a plurality of cells 36 included in the frame 22. In such embodiments, the plurality of cells 36 included in the surrounding region 28 may include each cell 36 included in the target region 24. Thus, the target region 24 may be smaller than the surrounding region 28. In embodiments in which the target object 26 is a hand, the surrounding region 28 may be a region of the frame 22 surrounding the hand and an object manipulated by the hand. For example, in embodiments in which the first video 20 is a video of a user's hands taken from a first-person perspective, the surrounding region 28 may include one or more left, right, top, top-left, and top-right cells 36 relative to the target region 24.

In some embodiments, as shown in the example of FIG. 2, the processor 12 may be configured to determine a first target region 24A and a second target region 24B of the frame 22. In the example of FIG. 2, the first target region 24A includes a first hand 26A and the second target region 24B includes a second hand 26B. The first hand 26A may manipulate a first manipulated object 60A and the second hand 26B may manipulate a second manipulated object 60B. In the example of FIG. 2, the first manipulated object 60A is a bowl and the second manipulated object 60B is a graduated cylinder. FIG. 2 also shows a first surrounding region 28A and a second surrounding region 28B within which the first target region 24A and the second target region 24B are respectively located. The first surrounding region 28A includes the first manipulated object 60A and the second surrounding region 28B includes the second manipulated object 60B. An identification of one or more manipulated objects by the processor 12 may be used when delimiting the one or more surrounding regions 28 included in a frame 22, as discussed in further detail below.

In some embodiments, each of the one or more surrounding regions 28 may be determined in one of the following ways. The surrounding region 28 may enclose one or more objects in a region surrounding the target object 26. Such objects may be detected using an "objectness" detector such as Faster-RCNN, YoloV2, or a saliency-based object detector. Alternatively, the surrounding region 28 may be determined based on a scale of the target object 26 in the frame 22. For instance, if a detected hand covers N×M pixels of the frame 22, the surrounding region 28 may be an sN×tM region. In some such embodiments, s and t may be fixed coefficients. In other embodiments, s and t may be determined using a machine learning algorithm by labeling a plurality of activation and/or attention maps. The plurality of activation and/or attention maps may be output by one or more action detectors or computed from one or more layers of the action detectors.

Returning to FIG. 1, the processor 12 may be further configured to extract one or more features 30 located in the surrounding region 28. The one or more features 30 may, for example, include one or more edges, corners, texture elements, and/or other types of features 30. The processor 12 may identify the one or more features 30 using a feature detection algorithm such as scale-invariant feature transform (SIFT), speeded up robust features (SURF), gradient localization and orientation histogram (GLOH), histogram of oriented gradients (HOG), or some other feature detection algorithm. In embodiments in which the frame includes a plurality of surrounding regions 28, the processor 12 may extract one or more features 30 for each of the surrounding regions 28.

From the one or more features 30, the processor 12 may be further configured to generate one or more manipulated object identifiers 32. Each manipulated object identifier 32 may specify one or more features 30 included in the manipulated object 60. In embodiments in which the target object 26 is a hand, the one or more manipulated object identifiers 32 may respectively identify one or more manipulated objects 60 manipulated by the hand. In some embodiments, the processor 12 may represent the one or more manipulated object identifiers 32 as one or more vectors.

In some embodiments, the one or more manipulated objects 60 may be detected without explicit feature extraction using an "objectness" detector outlined above. In such embodiments, the "objectness" detector may segment a region including a manipulated object 60 from the rest of the frame 22.

Figure 3:
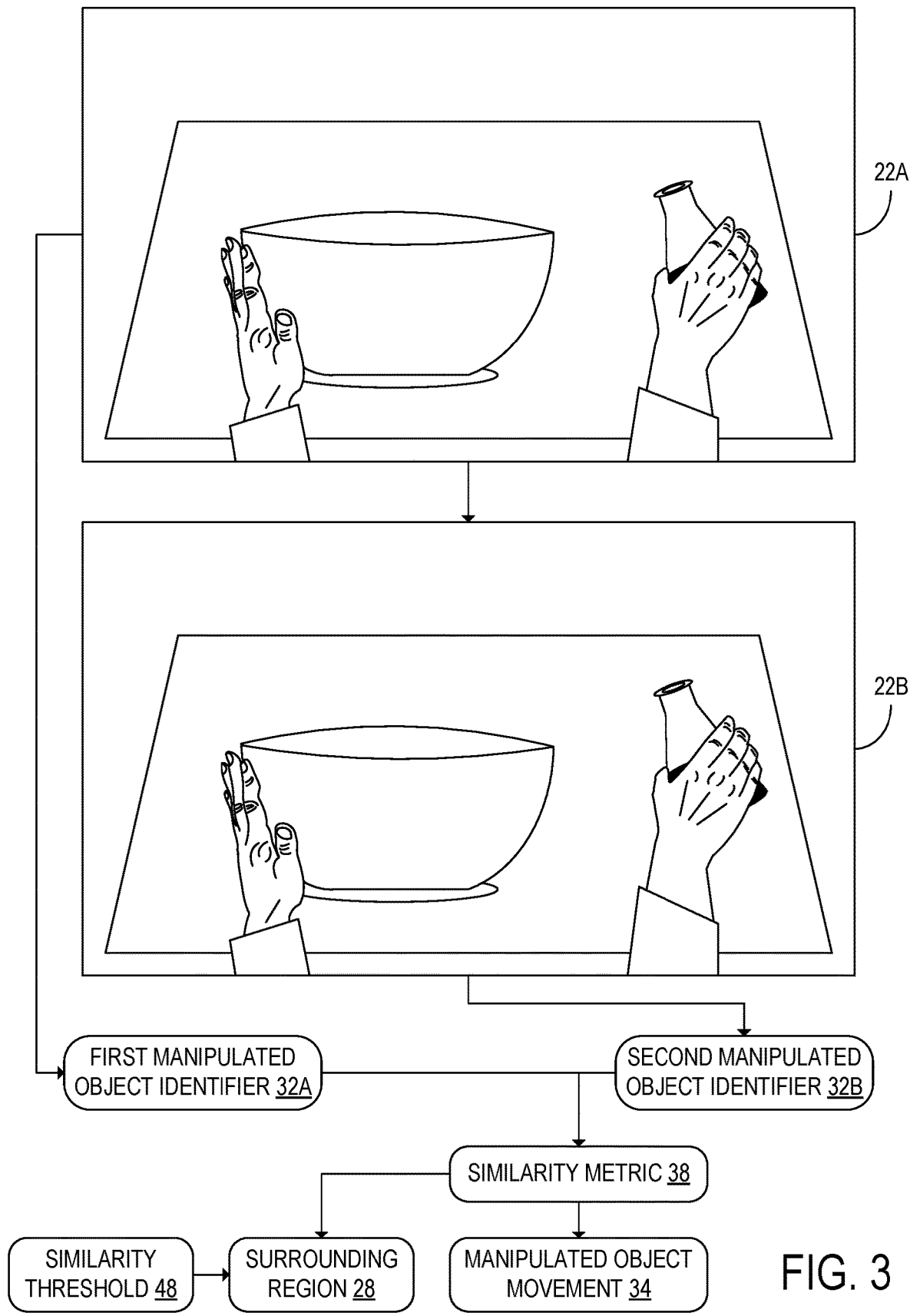
FIG. 3 shows an example determination of a manipulated object movement, according to the embodiment of FIG. 1.

FIG. 3 shows a pair of frames 22 including a first frame 22A and a second frame 22B. In the example of FIG. 3, the first frame 22A and the second frame 22B are consecutive frames 22 from the first video 20 of which a frame 22 is shown in FIG. 2. In the second frame 22B, the hand holding the graduated cylinder has moved upward relative to its position in the first frame 22A. For one or both of the first manipulated object 60A and the second manipulated object 60B shown in FIG. 2, the processor 12 may generate a respective manipulated object identifier 32. FIG. 3 shows a first manipulated object identifier 32A generated for one of the manipulated objects 60 in the first frame 22A. The processor 12 may be further configured to determine a second manipulated object identifier 32B for the manipulated object 60 in the second frame 22B.

The processor 12 may be further configured to determine a similarity metric 38 between the first manipulated object identifier 32A and the second manipulated object identifier 32B. For example, in some embodiments, the first manipulated object identifier 32A and the second manipulated object identifier 32B may be represented as vectors. In such embodiments, the similarity metric 38 may be a distance between the vectors. Other similarity metrics 38 may be used in other embodiments. Based on the similarity metric 38, the processor 12 may be further configured to determine a manipulated object movement 34 between the first manipulated object identifier 32A and the second manipulated object identifier 32B. In embodiments in which the first manipulated object identifier 32A and the second manipulated object identifier 32B are represented as vectors, the manipulated object movement 34 may be a difference between the vectors. In some embodiments, each manipulated object movement 34 may be an optical flow of a manipulated object 60 relative to the one or more sensors with which the first video 20 was captured. The processor 12 may compute the optical flow for the surrounding region 28 or for the entire frame 22.

In some embodiments, the similarity metric 38 may be further used to determine a size, shape, and/or location of the surrounding region 28 in one or more frames 22 of the first video 20. The processor 12 may, in such embodiments, be further configured to detect the manipulated object 60 in the frame 22. This detection may be made by determining that the similarity metric 38 between a region of the frame 22 and the manipulated object 60 as detected in another frame 22 exceeds a predetermined similarity threshold 48. In response to such a determination, the processor 12 may be further configured to set the surrounding region 28 in the frame 22 to the region for which the match was determined.

Returning to FIG. 1, the processor 12 may be further configured to classify at least one action performed in the first video 20 based on the plurality of manipulated object movements 34. Classifying the at least one action may include generating an action classification 50 including at least one action label 52 assigned to one or more frames 22 of the first video 20. The at least one action label 52 may be a text label in some embodiments. Additionally or alternatively, the at least one action label 52 may be selected from a predetermined set of action labels 52, which may be specified by the user. The action classification 50 may further include action metadata 54 such as at least one timestamp and/or at least one confidence level associated with the at least one action label 52.

Figure 4:
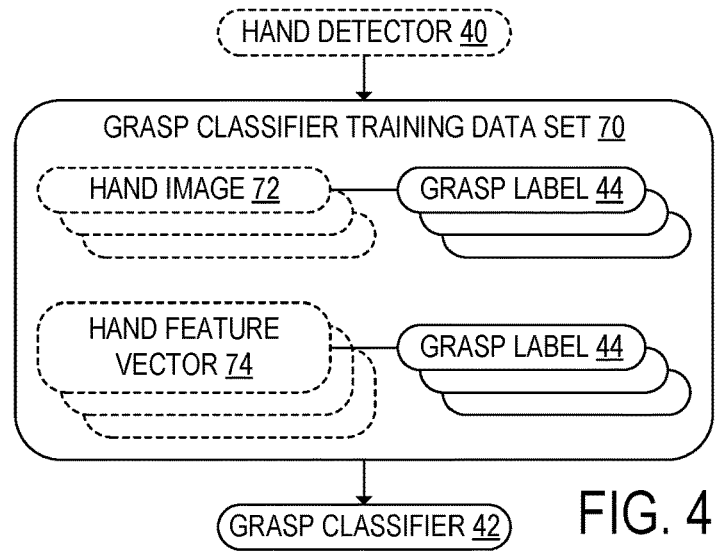
FIG. 4 shows an example of training a grasp classifier, according to the embodiment of FIG. 1.

In embodiments in which the target object 26 is a hand, classifying the at least one action may include inputting the plurality of manipulated object movements 34 into a grasp classifier 42. The grasp classifier 42 may be configured to output a grasp label 44 indicating a grasp type with which the hand grasps the one or more manipulated objects 60. The grasp type may describe a position and/or orientation of the user's hand relative to the manipulated object 60. The grasp type indicated by the grasp label 44 may be selected from a predetermined list of grasp types. The grasp classifier 42 may be further configured to output grasp metadata, which may be used as the action metadata 54 in some embodiments. In some embodiments, the grasp classifier 42 may be a recurrent neural network, for example, an LSTM network. In such embodiments, as shown in FIG. 4, the grasp classifier 42 may be trained using a grasp classifier training data set 70 including a plurality of hand images 72 with corresponding grasp labels 44. Instead of a plurality of hand images 72, a plurality of hand feature vectors 74 representing features of hands may be used to train the grasp classifier 42.

Figure 5:
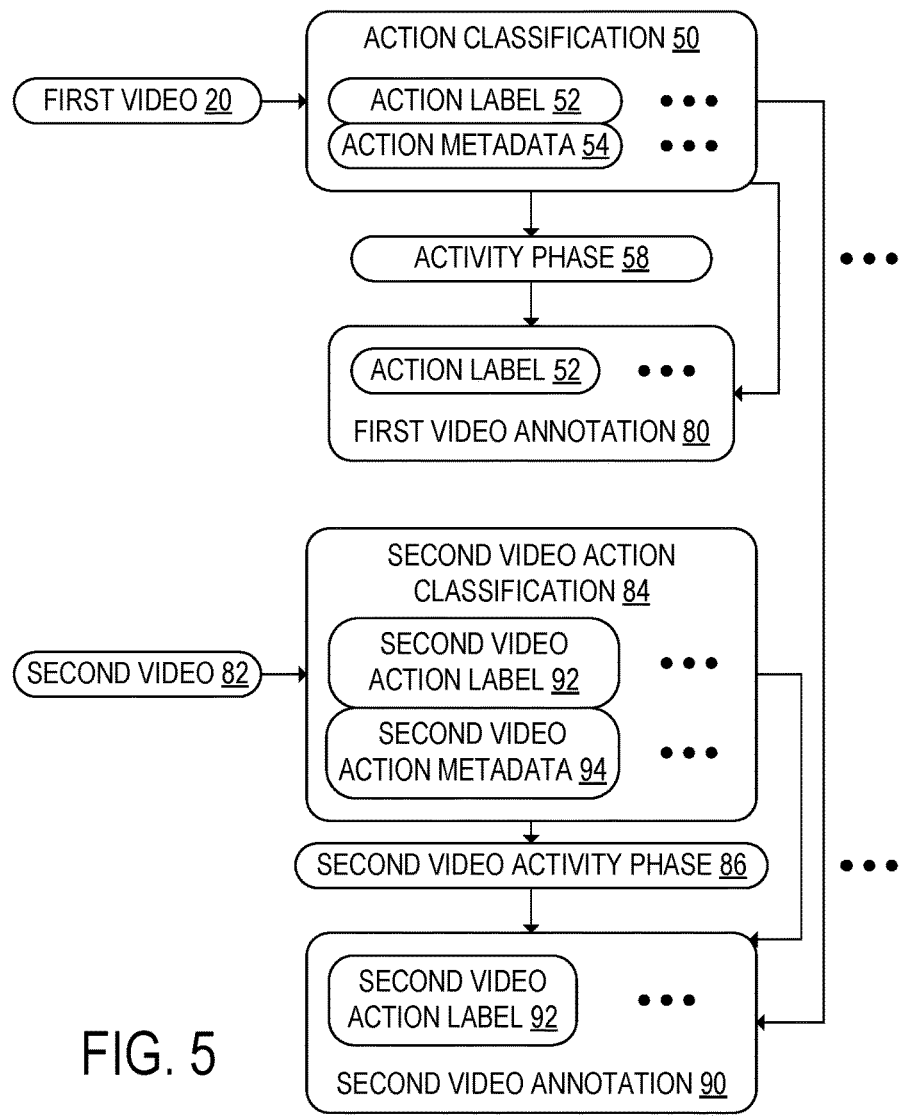
FIG. 5 shows an example of action classification for a first video and a second video, according to the embodiment of FIG. 1.

Returning to FIG. 1, the processor 12 may be further configured to classify a plurality of actions performed in the first video 20. When the processor 12 classifies a plurality of actions performed in the first video 20, the processor 12 may be further configured to segment the first video 20 into a plurality of activity phases 58, as shown in FIG. 5. The plurality of activity phases 58 may be defined by one or more respective actions of the plurality of actions performed during that activity phase 58. In some examples, only one action may be associated with any given activity phase 58, whereas a plurality of actions may be performed during an activity phase 58 in other examples. Each activity phase 58 may be associated with one or more action classification 50, as shown in FIG. 5. The processor 12 may be further configured to generate a plurality of action labels 52 respectively corresponding to the plurality of actions performed during the activity phases 58. In embodiments in which the processor 12 generates a plurality of action labels 52, the processor 12 may be further configured to output a first video annotation 80 including each action label 52 of the plurality of action labels 52. In such embodiments, the action label 52 of each action may be matched to the respective activity phase 58 in which that action is performed in the first video 20.

In embodiments in which the processor 12 is configured to segment the first video 20 into a plurality of activity phases 58, the processor 12 may be further configured to receive a second video 82. The second video 82 may be received from the head-mounted display device 100 in some embodiments. In other embodiments, the second video 82 may be received from some other computing device or may be captured by one or more onboard sensors of the computing device 10. Subsequently to receiving the second video 82, the processor 12 may be further configured to classify a second video action performed in the second video 82, thus generating a second video action classification 84. In some examples, the processor 12 may determine that the second video 82 includes a plurality of second video actions respectively occurring in a plurality of second video activity phases 86. The second video action classification 84 may include a respective second video action label 92 for each second video action identified in the second video action classification 84. The second video action classification 84 may further include second video action metadata 94 such as one or more timestamps and/or one or more confidence levels respectively associated with the one or more second video actions.

In embodiments in which the processor 12 receives a second video 82, the processor 12 may be further configured to determine that, for at least one second video action identified in the second video action classification 84, that the second video action matches an action of the plurality of actions identified in the first video 20. For example, the processor 12 may compare the one or more action labels 52 included in the action classification 50 of the first video 20 to the one or more second video action labels 92 included in the second video action classification 84. The processor 12 may be further configured to output a second video annotation 90 in response to the determination that the second video action matches the action identified in the first video 20. The second video annotation 90 may include the one or more second video action labels 92.

In some embodiments, the second video annotation 90 may be used to provide instructions for a user to perform one or more actions. For example, when the second video 82 is received from the head-mounted display device 100, the second video annotation 90 may provide instructions for a user wearing the head-mounted display device 100 as the user performs a task. In such embodiments, the head-mounted display device 100 may capture the second video 82 by imaging the user's hands. While the head-mounted display device captures the second video 82, the processor 12 may process the second video 82 in real time to generate the second video action classification 84 and/or the second video annotation 90 as discussed above. In embodiments in which the second video annotation 90 provides instructions for the user, the second video annotation 90 may include a subsequent phase action label associated with a subsequent activity phase following the second video activity phase 86 associated with the second video action. Thus, the second video annotation 90 may provide the user with a preview of the next step in the activity the user is performing. Additionally or alternatively, the second video annotation 90 may include the second video action label 92 associated with the current second video activity phase 86.

Figure 6:
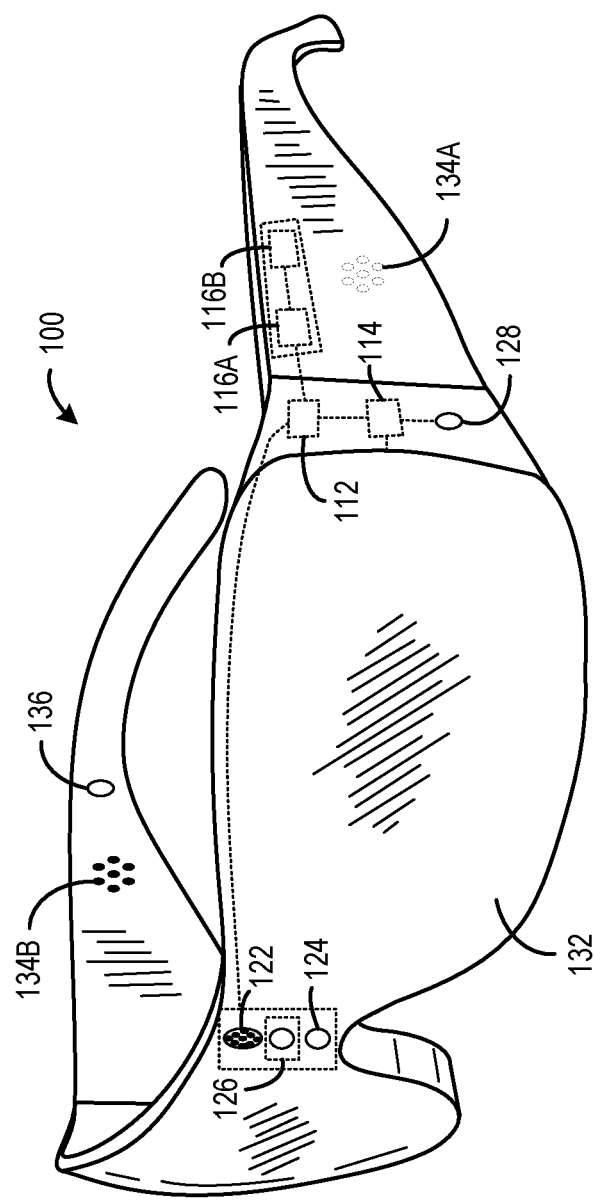
FIG. 6 shows an example head-mounted display device, according to the embodiment of FIG. 1.

An example of the head-mounted display device 100 is shown in FIG. 6. The head-mounted display device 100 of FIG. 6 has the form of wearable glasses or goggles, but it will be appreciated that other forms are possible. The head-mounted display device 100 may include an output device suite including a display 132. In some embodiments, the head-mounted display device 100 may be configured in an augmented reality configuration to present an augmented reality environment, and thus the display 132 may be an at least partially see-through stereoscopic display configured to visually augment an appearance of a physical environment being viewed by the user through the display 120. In some examples, the display 120 may include one or more regions that are transparent (e.g. optically clear) and may include one or more regions that are opaque or semi-transparent. In other examples, the display 120 may be transparent (e.g. optically clear) across an entire usable display surface of the display 120.

The head-mounted display device 100 may include a processor 112 and/or memory 114. Alternatively, the processor 112 and/or the memory 114 of the head-mounted display device 100 may be instantiated in one or more offboard computing devices with which the head-mounted display device 100 is configured to communicate. The computing device 10 of FIG. 1 may be used as the offboard computing device. Alternatively, one or more other local and/or remote computing devices may perform some or all of the functions of the processor 112 and/or memory 114. In other embodiments, all functions of the computing device 10 of FIG. 1 may be performed by the onboard processor 112 and memory 114 of the head-mounted display device 100.

The output device suite of the head-mounted display device 100 may, for example, include an image production system that is configured to display one or more virtual objects to the user with the display 132. The processor 112 may be configured to output for display on the display 132 a mixed reality experience including one or more virtual objects superimposed upon the physical environment. In the augmented reality configuration with an at least partially see-through display, the virtual objects are visually superimposed onto the physical environment that is visible through the display 132 so as to be perceived at various depths and locations. In some embodiments, the second video annotation 90 of FIG. 5 may be displayed as one or more virtual objects superimposed onto the physical environment. In one embodiment, the head-mounted display device 100 may use stereoscopy to visually place a virtual object at a desired depth by displaying separate images of the virtual object to both of the user's eyes such that the user will perceive that the virtual objects exist at a desired depth and location in the viewed physical environment.

Alternatively, the head-mounted display device 100 may be configured in a virtual reality configuration to present a full virtual reality environment, and thus the display 132 may be a non-see-though stereoscopic display. The head-mounted display device 100 may be configured to display virtual three-dimensional environments to the user via the non-see-through stereoscopic display. The head-mounted display device 100 may be configured to display a virtual representation such as a three-dimensional graphical rendering of the physical environment in front of the user that may include additional virtual objects. Displaying the virtual representation of the physical environment may include generating a two-dimensional projection of a three-dimensional model of the physical environment onto the surface of the display 132.

As another alternative, the computing system may include a portable computing device that is not head mounted, such as a smartphone or tablet computing device. In such a device, camera-based augmented reality may be achieved by capturing an image of the physical environment through a forward-facing camera and displaying the captured image on a user-facing display. While the computing system is primarily described in terms of the head-mounted display device 100 herein, it will be appreciated that many features of the head-mounted display device 100 are also applicable to such a portable computing device that is not head mounted.

The output device suite of the head-mounted display device 100 may further include one or more speakers configured to emit sound. In some embodiments, the head-mounted display device 100 may include at least a left speaker 134A and a right speaker 134B situated such that the left speaker 134A may be located proximate the user's left ear and the right speaker 134B may be located proximate the user's right ear when the head-mounted display device 100 is worn. Thus, the left speaker 134A and the right speaker 134B may emit stereo sound output. The output device suite may further include one or more haptic feedback devices 136 configured to provide tactile output (e.g., vibration).

The head-mounted display device 100 may include an input device suite including one or more input devices. The input device suite of the head-mounted display device 100 may include one or more optical sensors. In one example, the input device suite includes an outward-facing optical sensor 122 that may be configured to detect the real-world background from a similar vantage point (e.g., line of sight) as observed by the user through the display 132 in an augmented reality configuration. The input device suite may additionally include an inward-facing optical sensor 124 that may be configured to detect a gaze direction of the user's eyes. It will be appreciated that the outward facing optical sensor 122 and/or the inward-facing optical sensor 124 may include one or more component sensors, including a visible light camera and/or a depth camera. Depth data captured by the visible light camera may be combined with color information captured by the visible light camera into a single image representation including both color data and depth data, in some embodiments.

The input device suite of the head-mounted display device 100 may further include a position sensor system that may include one or more position sensors 126 such as accelerometer(s), gyroscope(s), magnetometer(s), global positioning system(s), multilateration tracker(s), and/or other sensors that output position data as a position, orientation, and/or movement of the relevant sensor. The input device suite may further include one or more microphones 128 configured to collect sound data.

Optical sensor information received from the one or more optical sensors and/or position data received from position sensors 126 may be used to assess a position and orientation of the vantage point of head-mounted display device 100 relative to other environmental objects. For example, the position and orientation of the vantage point may be determined using simultaneous localization and mapping (SLAM). In some embodiments, the position and orientation of the vantage point may be characterized with six degrees of freedom (e.g., world-space X, Y, Z, pitch, roll, yaw). The position and/or orientation may be determined by the processor 112 of the head-mounted display device 100 and/or by an off-board computing system.

Furthermore, the optical sensor information and the position sensor information may be used by the head-mounted display system to perform analysis of the real-world background, such as depth analysis, surface reconstruction, environmental color and lighting analysis, or other suitable operations. In particular, the optical and positional sensor information may be used to create a virtual model of the real-world background. Moreover, the virtual model may be used to determine positions of virtual objects in the virtual space and add additional virtual objects to be displayed to the user at a desired depth and location. Additionally, the optical sensor information received from the one or more optical sensors may be used to identify and track objects in the field of view of the one or more optical sensors. The optical sensors may also be used to identify machine recognizable visual features in the physical environment and use the relative movement of those features in successive frames to compute a frame to frame relative pose change for the head mounted display device 100 within the world space of the virtual model.

The head-mounted display device 100 may further include a communication system including one or more communication devices, which may include one or more receivers 116A and/or one or more transmitters 116B. In embodiments in which the head-mounted display device 100 communicates with an offboard computing system, the one or more receivers 116A may be configured to receive data from the offboard computing system, and the one or more transmitters 116B may be configured to send data to the offboard computing system. In some embodiments, the head-mounted display device 100 may communicate with the off-board computing system via a network, which may be a wireless local- or wide-area network. Additionally or alternatively, the head-mounted display device 100 may communicate with the off-board computing system via a wired connection.

Figure 7A:
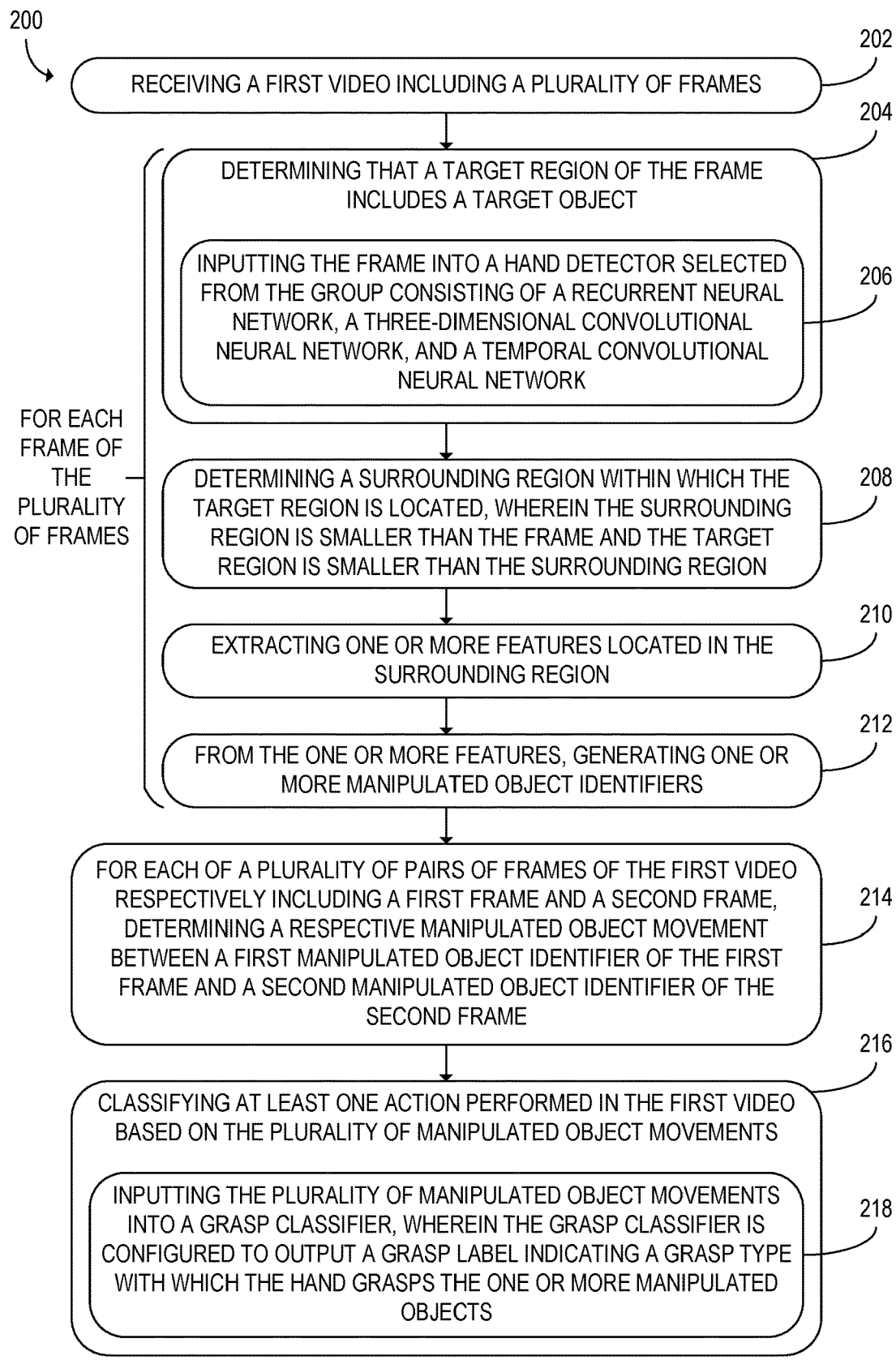
FIG. 7A shows a flowchart of an example method that may be used with a computing device, according to the embodiment of FIG. 1.

Turning now to FIG. 7A, a flowchart of a method 200 for use with a computing device is depicted. The computing device with which the method 200 is used may be the computing device 10 of FIG. 1 or alternatively some other computing device. At step 202, the method 200 may include receiving a first video including a plurality of frames. In some embodiments, the first video may be received from another computing device, which may be a head-mounted display device or some other type of computing device. In embodiments in which the first video is a head-mounted display device, the first video may be captured by an outward-facing camera of the head-mounted display device.

At step 204, which may be performed for each frame of the plurality of frames, the method 200 may further include determining that a target region of the frame includes a target object. In some embodiments, the target object may be a hand. For example, when the first video is received from a head-mounted display device, the target object may be a hand of the user of the head-mounted display device. Other example target objects may be a whole body of the user and/or a tool manipulated by the user. In some embodiments, a plurality of target objects, such as both hands of the user, may be included in at least one frame of the plurality of frames. In some embodiments, the frame may be divided into a grid including a plurality of rectangular cells. In such embodiments, the target region may be formed from one or more of the cells.

In embodiments in which the target object is a hand, step 204 may include, at step 206, inputting the frame into a hand detector. The hand detector may be a machine learning algorithm selected from the group consisting of an RNN, a 3D-CNN, and a TCNN. In embodiments in which the hand detector is an RNN, the hand detector may be an LSTM network. Alternatively to the algorithms listed above, other types of machine learning algorithms may be used to instantiate the hand detector.

For each frame of the plurality of frames, the method 200 may further include determining a surrounding region within which the target region is located. The surrounding region may be smaller than the frame. In addition, the target region may be smaller than the surrounding region. In some embodiments, the surrounding region may entirely surround the target region, whereas in other embodiments, the target region may include at least a portion of the frame not included in the surrounding region. The surrounding region may be determined based at least in part on an identification of a manipulated object in another frame of the video.

For each frame, for each surrounding region included in that frame, the method 200 may further include extracting one or more features located in the surrounding region. For example, the one or more features may include one or more edges, corners, or texture elements. The one or more features may be detected using a feature detection algorithm such as SIFT, SURF, GLOH, HOG, or some other feature detection algorithm. At step 212, the method 200 may further include generating one or more manipulated object identifiers from the one or more features. Each of the one or more manipulated object identifiers may be generated at least in part by grouping together one or more of the features identified in the surrounding region.

At step 214, for each of a plurality of pairs of frames of the first video respectively including a first frame and a second frame, the method 200 may further include determining a respective manipulated object movement between a first manipulated object identifier of the first frame and a second manipulated object identifier of the second frame. The pair of frames may be two consecutive frames of the video. In some embodiments, the manipulated object movement may be an optical flow. Determining the manipulated object movement for a pair of frames may include determining, based on the respective manipulated object identifiers for those frames, that at least one manipulated object is present in both frames. In some embodiments, determining that the at least one manipulated object is present in both frames may include evaluating a similarity metric for the first manipulated object identifier and the second manipulated object identifier. For example, when the first manipulated object identifier and the second manipulated object identifier are represented as vectors, step 214 may include determining a distance between the vectors.

At step 216, the method 200 may further include classifying at least one action performed in the first video based on the plurality of manipulated object movements. Classifying the at least one action may include generating a respective action label for the at least one action. The at least one action label may be a text label and may additionally or alternatively be selected from a set of predetermined action labels. In embodiments in which the target object is a hand, step 216 may include, at step 218, inputting the plurality of manipulated object movements into a grasp classifier. The grasp classifier may be a recurrent neural network such as an LSTM network. The grasp classifier may be configured to output a grasp label indicating a grasp type with which the hand grasps the one or more manipulated objects. The grasp type may describe a position and/or orientation of the user's hand relative to the manipulated object. In some embodiments, the grasp label may be a text label and may indicate a grasp type selected from a predetermined list of grasp types.

Figure 7B:
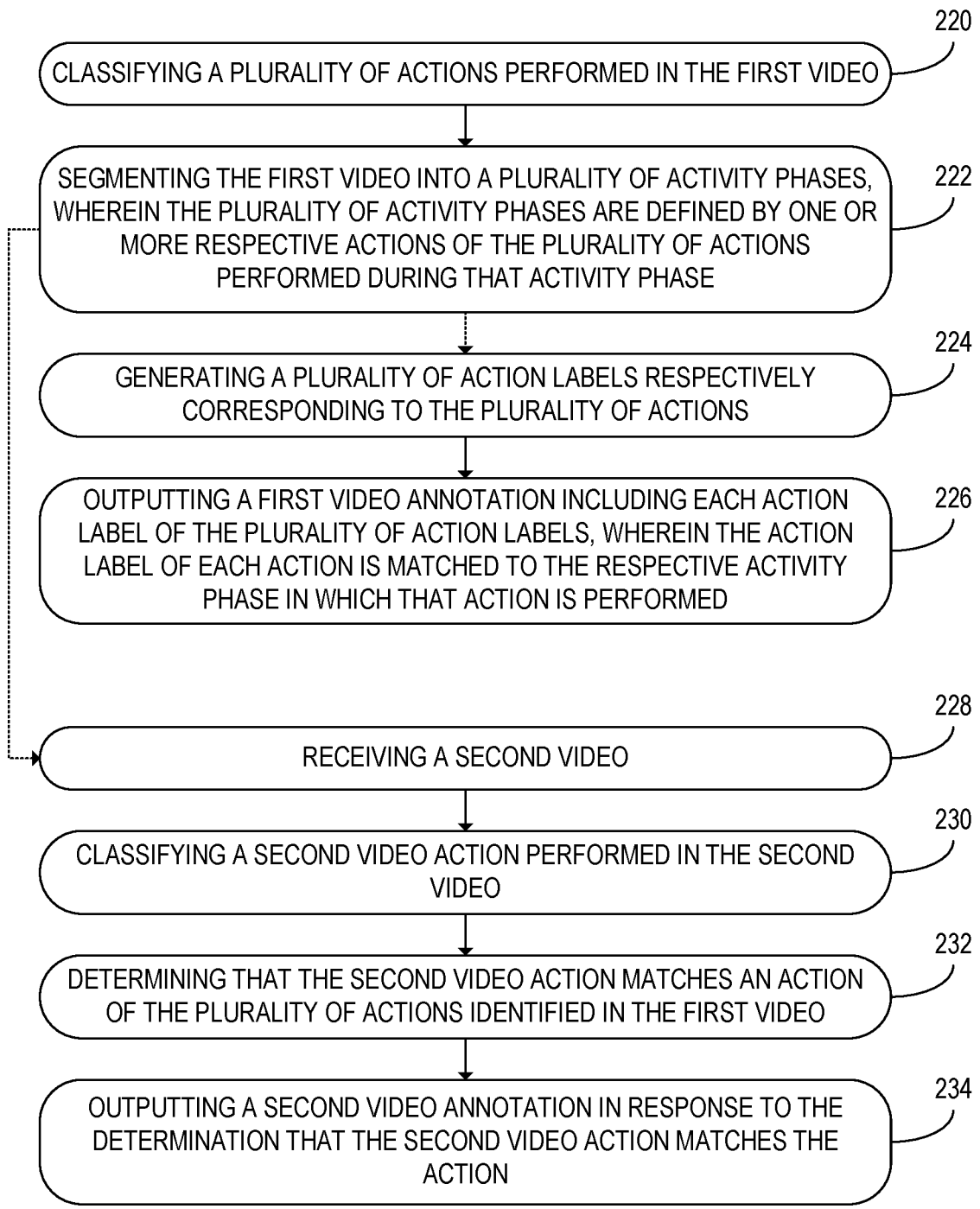
FIG. 7B shows additional steps that may be performed when performing the method of FIG. 7A.

FIG. 7B shows additional steps of the method 200 that may be performed in some embodiments. At step 220, the method 200 may further include classifying a plurality of actions performed in the first video. The plurality of actions may be classified as in step 216, described above. At step 222, the method 200 may further include segmenting the first video into a plurality of activity phases. The plurality of activity phases may be defined by one or more respective actions of the plurality of actions performed during that activity phase. In some embodiments, an activity phase may include two or more actions performed concurrently, for example, a first action performed by a first hand and a second action performed by a second hand. In such embodiments, the activity phase may be defined by the combination of actions performed in it, or alternatively by a particular action of the two or more actions.

In some embodiments, at step 224, the method 200 may further include generating a plurality of action labels respectively corresponding to the plurality of actions. The plurality of action labels may be generated as discussed above with reference to step 216. In embodiments in which step 224 is performed, the method 200 may further include, at step 226, outputting a first video annotation including each action label of the plurality of action labels. In the first video annotation, the action label of each action may be matched to the respective activity phase in which that action is performed. For example, the first video annotation may be displayed as one or more captions alongside or overlaid upon the first video.

In some embodiments, additionally or alternatively to steps 224 and 226, the method 200 may further include, at step 228, receiving a second video. For example, the second video may be received from an outward-facing camera of a head-mounted display device worn by a user. As another example, the second video may be captured using a smartphone or other handheld computing device. At step 230, the method 200 may further include classifying a second video action performed in the second video. The second video action may be classified based on a plurality of manipulated object movements that occur in the second video, as in the steps shown in FIG. 7A. At step 232, the method 200 may further include determining that the second video action matches an action of the plurality of actions identified in the first video. For example, step 232 may include determining that at least one action label selected from a predetermined set of action labels occurs in the respective action classifications of both the first video and the second video. At step 234, the method 200 may further include outputting a second video annotation in response to the determination that the second video action matches the action. The second video annotation may, similarly to the first video annotation, be displayed as one or more captions alongside or overlaid upon the first video.

An example use case for the systems and methods described above is now provided. In this example, the first video is a video of the user's hands taken from a first-person perspective as the user prepares a salad. As the user prepares the salad, the user performs a variety of actions such as chopping tomatoes, washing lettuce, and grinding pepper. The objects manipulated by the user may be objects that would be unlikely to appear in preexisting training data sets used to train machine learning algorithms to classify objects in videos. Using the systems and methods discussed above, the processor may recognize the user's hands and track the movement of objects in the vicinity of the user's hands. In this example, the processor uses a hand detector and a grasp classifier to detect that the video shows the user's hands and to classify the positions of the user's hands relative to manipulated objects.

The systems and methods describe above allow for savings in time and computing resources by selectively analyzing a target region and a surrounding region. In addition, the systems and methods described above allow a pretrained hand detector and/or grasp classifier to be used when classifying actions in a video. Thus, the systems and methods described above allow the processor to classify actions performed by a user even when those actions involve objects for which it would be impractical to provide large amounts of training data. In addition, the processor may distinguish between the manipulated objects and the background such that features of the background are not mistakenly identified as being involved in the actions performed by the user. These advantages allow machine learning algorithms for classifying actions performed in videos to classify actions with greater accuracy and to be trained using smaller training data sets.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
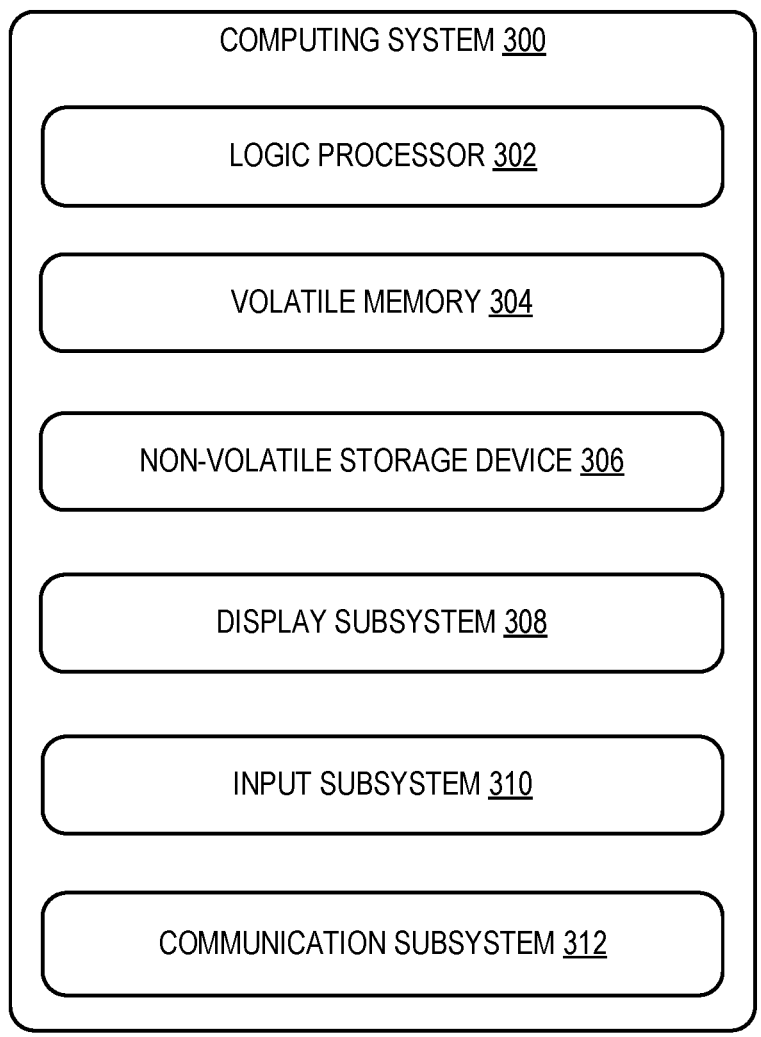
FIG. 8 shows a schematic view of an example computing environment in which the computer device of FIG. 1 may be enacted.

FIG. 8 schematically shows a non-limiting embodiment of a computing system 300 that can enact one or more of the methods and processes described above. Computing system 300 is shown in simplified form. Computing system 300 may embody the computing device 10 described above and illustrated in FIG. 1. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 8.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

According to one aspect of the present disclosure, a computing device is provided, including a processor. The processor may be configured to receive a first video including a plurality of frames. For each frame of the plurality of frames, the processor may be further configured to determine that a target region of the frame includes a target object. The processor may be further configured to determine a surrounding region within which the target region is located. The surrounding region may be smaller than the frame, and the target region may be smaller than the surrounding region. The processor may be further configured to extract one or more features located in the surrounding region. From the one or more features, the processor may be further configured to generate one or more manipulated object identifiers. For each of a plurality of pairs of frames of the first video respectively including a first frame and a second frame, the processor may be further configured to determine a respective manipulated object movement between a first manipulated object identifier of the first frame and a second manipulated object identifier of the second frame. The processor may be further configured to classify at least one action performed in the first video based on the plurality of manipulated object movements.

According to this aspect, the target object may be a hand.

According to this aspect, the one or more manipulated object identifiers may respectively identify one or more manipulated objects manipulated by the hand.

According to this aspect, the processor may be configured to classify the at least one action at least in part by inputting the plurality of manipulated object movements into a grasp classifier. The grasp classifier may be configured to output a grasp label indicating a grasp type with which the hand grasps the one or more manipulated objects.

According to this aspect, the grasp classifier may be a recurrent neural network.

According to this aspect, the processor may be configured to determine that the target region of the frame includes a hand at least in part by inputting the frame into a hand detector selected from the group consisting of a recurrent neural network, a three-dimensional convolutional neural network, and a temporal convolutional neural network.

According to this aspect, the processor may be further configured to classify a plurality of actions performed in the first video. The processor may be further configured to segment the first video into a plurality of activity phases. The plurality of activity phases may be defined by one or more respective actions of the plurality of actions performed during that activity phase.

According to this aspect, the processor may be further configured to generate a plurality of action labels respectively corresponding to the plurality of actions. The processor may be further configured to output a first video annotation including each action label of the plurality of action labels. The action label of each action may be matched to the respective activity phase in which that action is performed.

According to this aspect, the processor may be further configured to receive a second video. The processor may be further configured to classify a second video action performed in the second video. The processor may be further configured to determine that the second video action matches an action of the plurality of actions identified in the first video. The processor may be further configured to output a second video annotation in response to the determination that the second video action matches the action.

According to this aspect, the second video annotation may include a subsequent phase action label associated with a subsequent activity phase following a second video activity phase associated with the second video action.

According to this aspect, the processor may be configured to generate the one or more manipulated object identifiers at least in part by inputting the one or more features into a manipulated object classifier selected from the group consisting of a recurrent neural network, a three-dimensional convolutional neural network, and a temporal convolutional neural network.

According to this aspect, each manipulated object movement may be an optical flow.

According to another aspect of the present disclosure, a method for use with a computing device is provided. The method may include receiving a first video including a plurality of frames. For each frame of the plurality of frames, the method may further include determining that a target region of the frame includes a target object. The method may further include determining a surrounding region within which the target region is located. The surrounding region may be smaller than the frame, and the target region may be smaller than the surrounding region. The method may further include extracting one or more features located in the surrounding region. The method may further include, from the one or more features, generating one or more manipulated object identifiers. For each of a plurality of pairs of frames of the first video respectively including a first frame and a second frame, the method may further include determining a respective manipulated object movement between a first manipulated object identifier of the first frame and a second manipulated object identifier of the second frame. The method may further include classifying at least one action performed in the first video based on the plurality of manipulated object movements.

According to this aspect, the target object may be a hand.

According to this aspect, the one or more manipulated object identifiers may respectively identify one or more manipulated objects manipulated by the hand.

According to this aspect, classifying the at least one action may include inputting the plurality of manipulated object movements into a grasp classifier. The grasp classifier may be configured to output a grasp label indicating a grasp type with which the hand grasps the one or more manipulated objects.

According to this aspect, the method may further include classifying a plurality of actions performed in the first video. The method may further include segmenting the first video into a plurality of activity phases. The plurality of activity phases may be defined by one or more respective actions of the plurality of actions performed during that activity phase.

According to this aspect, the method may further include generating a plurality of action labels respectively corresponding to the plurality of actions. The method may further include outputting a first video annotation including each action label of the plurality of action labels. The action label of each action may be matched to the respective activity phase in which that action is performed.

According to this aspect, the method may further include receiving a second video. The method may further include classifying a second video action performed in the second video. The method may further include determining that the second video action matches an action of the plurality of actions identified in the first video. The method may further include outputting a second video annotation in response to the determination that the second video action matches the action.

According to another aspect of the present disclosure, a computing device is provided including a processor. The processor may be configured to receive a first video including a plurality of frames. For each frame of the plurality of frames. The processor may be further configured to determine that a first target region of the frame includes a first hand and a second target region of the frame includes a second hand. The processor may be configured to determine a first surrounding region within which the first target region is located and a second surrounding region within which the second target region is located. The first surrounding region and the second surrounding region may each be smaller than the frame. The processor may be further configured to identify one or more first surrounding region features located in the first surrounding region. The processor may be further configured to identify one or more second surrounding region features located in the second surrounding region. From the one or more first surrounding region features and/or the one or more second surrounding region features, the processor may be further configured to generate one or more manipulated object identifiers that respectively identify one or more manipulated objects manipulated by the first hand and/or the second hand. For each of a plurality of pairs of frames of the first video respectively including a first frame and a second frame, the processor may be further configured to determine a respective manipulated object movement between a first manipulated object identifier of the first frame and a second manipulated object identifier of the second frame. The processor may be further configured to classify a plurality of actions performed in the first video based on the plurality of manipulated object movements.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a processor configured to:
receive a first video including a plurality of frames;
for each frame of the plurality of frames:
determine that a target region of the frame includes a target object;
determine a surrounding region within which the target region is located, wherein the surrounding region is smaller than the frame and the target region is smaller than the surrounding region;
extract one or more features located in the surrounding region; and
from the one or more features, generate one or more manipulated object identifiers;
for each of a plurality of pairs of frames of the first video respectively including a first frame and a second frame, determine a respective manipulated object movement between a first manipulated object identifier of the first frame and a second manipulated object identifier of the second frame; and
classify at least one action performed in the first video based on the manipulated object movements.

2. The computing device of claim 1, wherein the target object is a hand.

3. The computing device of claim 2, wherein the one or more manipulated object identifiers respectively identify one or more manipulated objects manipulated by the hand.

4. The computing device of claim 3, wherein the processor is configured to classify the at least one action at least in part by inputting the manipulated object movements into a grasp classifier, wherein the grasp classifier is configured to output a grasp label indicating a grasp type with which the hand grasps the one or more manipulated objects.

5. The computing device of claim 4, wherein the grasp classifier is a recurrent neural network.

6. The computing device of claim 2, wherein the processor is configured to determine that the target region of the frame includes a hand at least in part by inputting the frame into a hand detector selected from the group consisting of a recurrent neural network, a three-dimensional convolutional neural network, and a temporal convolutional neural network.

7. The computing device of claim 1, wherein the processor is further configured to:
classify a plurality of actions performed in the first video; and
segment the first video into a plurality of activity phases, wherein the plurality of activity phases are defined by one or more respective actions of the plurality of actions performed during that activity phase.

8. The computing device of claim 7, wherein the processor is further configured to:
generate a plurality of action labels respectively corresponding to the plurality of actions; and
output a first video annotation including each action label of the plurality of action labels, wherein the action label of each action is matched to a respective activity phase in which that action is performed.

9. The computing device of claim 7, wherein the processor is further configured to:
receive a second video;
classify a second video action performed in the second video;
determine that the second video action matches an action of the plurality of actions identified in the first video; and
output a second video annotation in response to the determination that the second video action matches the action.

10. The computing device of claim 9, wherein the second video annotation includes a subsequent phase action label associated with a subsequent activity phase following a second video activity phase associated with the second video action.

11. The computing device of claim 1, wherein the processor is configured to generate the one or more manipulated object identifiers at least in part by inputting the one or more features into a manipulated object classifier selected from the group consisting of a recurrent neural network, a three-dimensional convolutional neural network, and a temporal convolutional neural network.

12. The computing device of claim 1, wherein each manipulated object movement is an optical flow.

13. A method for use with a computing device, the method comprising:
receiving a first video including a plurality of frames;
for each frame of the plurality of frames:
determining that a target region of the frame includes a target object;
determining a surrounding region within which the target region is located, wherein the surrounding region is smaller than the frame and the target region is smaller than the surrounding region;
extracting one or more features located in the surrounding region; and
from the one or more features, generating one or more manipulated object identifiers;
for each of a plurality of pairs of frames of the first video respectively including a first frame and a second frame, determining a respective manipulated object movement between a first manipulated object identifier of the first frame and a second manipulated object identifier of the second frame; and
classifying at least one action performed in the first video based on the manipulated object movements.

14. The method of claim 13, wherein the target object is a hand.

15. The method of claim 14, wherein the one or more manipulated object identifiers respectively identify one or more manipulated objects manipulated by the hand.

16. The method of claim 15, wherein classifying the at least one action includes inputting the manipulated object movements into a grasp classifier, wherein the grasp classifier is configured to output a grasp label indicating a grasp type with which the hand grasps the one or more manipulated objects.

17. The method of claim 13, further comprising:
classifying a plurality of actions performed in the first video; and
segmenting the first video into a plurality of activity phases, wherein the plurality of activity phases are defined by one or more respective actions of the plurality of actions performed during that activity phase.

18. The method of claim 17, further comprising:
generating a plurality of action labels respectively corresponding to the plurality of actions; and
outputting a first video annotation including each action label of the plurality of action labels, wherein the action label of each action is matched to a respective activity phase in which that action is performed.

19. The method of claim 17, further comprising:
receiving a second video;
classifying a second video action performed in the second video;
determining that the second video action matches an action of the plurality of actions identified in the first video; and
outputting a second video annotation in response to the determination that the second video action matches the action.

20. A computing device comprising:
a processor configured to:
receive a first video including a plurality of frames;
for each frame of the plurality of frames:
determine that a first target region of the frame includes a first hand and a second target region of the frame includes a second hand;
determine a first surrounding region within which the first target region is located and a second surrounding region within which the second target region is located, wherein the first surrounding region and the second surrounding region are each smaller than the frame;
identify one or more first surrounding region features located in the first surrounding region;
identify one or more second surrounding region features located in the second surrounding region; and
from the one or more first surrounding region features and/or the one or more second surrounding region features, generate one or more manipulated object identifiers that respectively identify one or more manipulated objects manipulated by the first hand and/or the second hand;
for each of a plurality of pairs of frames of the first video respectively including a first frame and a second frame, determine a respective manipulated object movement between a first manipulated object identifier of the first frame and a second manipulated object identifier of the second frame;
classify a plurality of actions performed in the first video based on the manipulated object movements.

* * * * *